US011335913B2

(12) United States Patent
Shin et al.

(10) Patent No.: US 11,335,913 B2
(45) Date of Patent: May 17, 2022

(54) METHOD FOR MANUFACTURING SOLID OXIDE CELL HAVING THREE-DIMENSIONAL CERAMIC COMPOSITE INTERFACE STRUCTURE

(71) Applicants: GLOBAL FRONTIER CENTER FOR MULTISCALE ENERGY SYSTEMS, Seoul (KR); SEOUL NATIONAL UNIVERSITY R&DB FOUNDATION, Seoul (KR); KOREA INSTITUTE OF SCIENCE AND TECHNOLOGY, Seoul (KR)

(72) Inventors: Sung Soo Shin, Seoul (KR); Man Soo Choi, Seoul (KR); Jeong Hun Kim, Seoul (KR); Hyoungchul Kim, Seoul (KR); Ji-Won Son, Seoul (KR)

(73) Assignees: GLOBAL FRONTIER CENTER FOR MULTISCALE ENERGY S., Seoul (KR); SEOUL NATIONAL UNIVERSITY R&DB FOUNDATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 49 days.

(21) Appl. No.: 16/757,953

(22) PCT Filed: Oct. 23, 2018

(86) PCT No.: PCT/KR2018/012551
§ 371 (c)(1),
(2) Date: Apr. 21, 2020

(87) PCT Pub. No.: WO2019/083251
PCT Pub. Date: May 2, 2019

(65) Prior Publication Data
US 2020/0321623 A1    Oct. 8, 2020

(30) Foreign Application Priority Data

Oct. 23, 2017 (KR) .................. 10-2017-0137142

(51) Int. Cl.
*H01M 4/88* (2006.01)
*H01M 8/1213* (2016.01)
*H01M 8/1246* (2016.01)

(52) U.S. Cl.
CPC ....... *H01M 4/8875* (2013.01); *H01M 4/8871* (2013.01); *H01M 4/8896* (2013.01); *H01M 8/1213* (2013.01); *H01M 8/1246* (2013.01)

(58) Field of Classification Search
CPC ............. H01M 4/8875; H01M 4/8871; H01M 4/8896; H01M 8/1213; H01M 8/1246
See application file for complete search history.

(56) References Cited

U.S. PATENT DOCUMENTS

| 7,955,461 B2 | 6/2011 | Mase et al. |
| 2013/0224628 A1 | 8/2013 | Moon et al. |

FOREIGN PATENT DOCUMENTS

| JP | 2016-143629 A | 8/2016 |
| JP | 2016-181350 A | 10/2016 |
| JP | 2016-207384 A | 12/2016 |
| KR | 10-2011-0041288 A | 4/2011 |
| KR | 10-1191638 B1 | 10/2012 |
| KR | 10-2013-0099704 A | 9/2013 |
| WO | 2007-084776 A2 | 7/2007 |

OTHER PUBLICATIONS

An et al., "3-D Nanostructured Bilayer Solid Oxide Fuel Cell with 1.3 W/cm2 at 450° C.", Nano Letters, DOI 10.1021/hl402661p, . p. 1-22, Aug. 26, 2013.
Ju et al., "Sm(Sr)CoO3 Cone Cathode on LaGaO3 Thin Film Electrolyte for IT-SOFC with High Power Density", Journal of The Electrochemical Society, 158 (7) B825-B830 (2011).
International Search Report for Application No. PCT/KR2018/012551 dated Apr. 12, 2019.
Office Action from corresponding Korean Patent Application No. 10-2017-0137142 dated May 21, 2019 (Google Translation).

*Primary Examiner* — Sarah A. Slifka
(74) *Attorney, Agent, or Firm* — Christensen, Fonder, Dardi & Herbert PLLC; Peter S. Dardi; Diane Bennett

(57) ABSTRACT

The present invention presents a method for manufacturing a negative electrode of a solid oxide cell in a three-dimensional structure by using a pressurization process. In addition, the present invention proposes a structure in which the entire interface of a solid oxide cell is manufactured on the manufactured three-dimensional negative electrode substrate, through various deposition methods, in a three-dimensional structure so as to maximize a reaction area.

18 Claims, 5 Drawing Sheets

METHOD FOR MANUFACTURING SOLID OXIDE CELL HAVING THREE-DIMENSIONAL CERAMIC COMPOSITE INTERFACE STRUCTURE

CROSS REFERENCE TO RELATED APPLICATIONS

This application is a National Stage filing of PCT Application No. PCT/KR2018/012551 filed Oct. 23, 2018, entitled "Method For Manufacturing Solid Oxide Cell Having Three-Dimensional Ceramic Composite Interface Structure", which claims priority to Korean Patent Application No. 10-2017-0137142 filed Oct. 23, 2017, both of which are incorporated herein by reference.

BACKGROUND OF THE INVENTION

1. Field of the Invention

This application claims the benefit of priority to Korean Patent Application No. 10-2017-0137142, filed on Oct. 23, 2017, the entire disclosure of which is incorporated herein by reference.

The present invention relates to a method for manufacturing solid oxide cell comprising a three-dimensional ceramic composite interface structure. More specifically, the present invention relates to a method for manufacturing a solid oxide cell comprising a three-dimensional ceramic composite interface structure, in which an interface of an anode functional layer of the solid oxide cell is manufactured in a three-dimensional structure through a high temperature pressurization process using a polymer mold having a three-dimensional pattern structure, and an electrolyte and a cathode are sequentially formed on the surface of the resulting anode functional layer having a three-dimensional structure by various film-forming processes to prepare an entire interface of the solid oxide cell in a three-dimensional structure.

2. Description of the Related Art

The solid oxide cell injects hydrogen gas or hydrocarbon-based fuel into an anode (a negative electrode) and oxygen gas (or air) into a cathode (a positive electrode) to generate direct current electricity, water and heat through the electrochemical reaction of hydrogen and oxygen. In this case, the discharged electrons perform electrical work in the process of moving to the cathode. By increasing the reaction areas of the anode and the cathode, higher efficiency can be obtained.

In the conventional fuel cell technology utilizing a solid oxide cell, a cell having a structure in which a cathode, an anode and an electrolyte are stacked in a two-dimensional planar shape was manufactured. These cells contact with a respective structure in a flat state, and thus there is a theoretical limit in the reaction area. In order to overcome this limitation on the reaction area, several processes have been proposed in which the reaction surface has a micro/nano structure.

WO 2007/084776 describes that a membrane electrode assembly of a solid oxide cell is manufactured to have a structure in which flat surface and concave surface are repeated to increase the reaction area and improve the degree of integration. Although the structure in the patent literature has the advantage of having a larger reaction area as the assembly itself, there are disadvantages of process difficulties and weak durability.

U.S. Pat. No. 7,955,461 B2 describes that a slurry mixture is filled in a mold having a predetermined 3-D shape and transferred to a substrate by applying heat and pressure to prepare a 3-D structure. Although the structure was manufactured by transferring the shape of the three-dimensional mold to the substrate, it is more difficult to control the thickness of the remaining layer, compared to the technique of forming the structure on the substrate itself in the solid state, and the strategy for battery manufacturing is not described.

Journal of The Electrochemical Society (158 (7) B825-B830 (2011)) discloses that cone-shaped $Sm_{0.5}Sr_{0.5}CoO_3$ (SSC) thin film structure is prepared and SSC particles are laminated thereon to produce a positive electrode having a micro structure. A positive electrode portion of the solid oxide cell was manufactured to have a micro structure to increase the reaction area, thereby improving efficiency and durability. However, in this literature, it is possible to manufacture a micro structure only in the positive electrode through a bottom-up process, and there are disadvantages that the reaction area is also smaller than that in the case where all interfaces of the negative electrode, the electrolyte, and the positive electrode have a three-dimensional structure.

Nano Letters (2013) 4551-4555 discloses that a three-dimensional structure is manufactured by etching a silicon substrate and a solid oxide fuel cell (SOFC) having a three-dimensional structure is manufactured by forming an electrolyte and a Pt electrode on the substrate by deposition to increase an interface area. In this literature, a three-dimensional structure was formed on the substrate, and the interface area of the electrolyte and the electrode portion was enlarged to improve the battery performance. However, when manufacturing a substrate using a semiconductor process, there is a disadvantage that a lot of cost and time is consumed.

Therefore, there is a need for a manufacturing process of a solid oxide cell, which enables manufacturing at low cost and high efficiency while allowing entire components to have a surface of a micro/nano structure to expand the reaction area in a solid oxide cell.

SUMMARY OF THE INVENTION

The present invention is designed to overcome planar contact between an electrode and an electrolyte produced by film forming of the ceramic planar film and to increase efficiency through a three-dimensional structure. In order to increase the reaction area in a two-dimensional planar structure, the area of the solid oxide cell inevitably needs to be enlarged. However, if a three-dimensional structure is inserted at the interface between the components, the reaction area can be dramatically increased in the cell having the same size. Since the maximum output of the solid oxide cell is proportional to the reaction area, it is expected that the efficiency of the electrochemical reaction will be increased by the three-dimensional structure.

To this end, an object of the present invention is to prepare an anode surface of a solid oxide cell in a three-dimensional structure through a high-temperature pressing process using a polymer mold having a three-dimensional structure, and to prepare interface of each component of the solid oxide cell in a three-dimensional structure on the three-dimensional anode substrate through a variety of deposition methods, thereby maximizing a reaction area.

In order to achieve the object, the present invention provides a method for manufacturing a solid oxide cell comprising a three-dimensional ceramic composite interface structure, the method comprising:

preparing tapes of an anode support layer and an anode functional layer, preparing a polymer mold having a three-dimensional structure, pressing/heating the polymer mold having a three-dimensional structure on the tape of the anode support layer or anode functional layer to form an anode substrate having a three-dimensional structure on its surface;

removing the polymer mold from the anode substrate, film-forming an electrolyte layer on the anode substrate having a three-dimensional structure on its surface by a film forming method, and then heat-treating it, and film-forming a cathode functional layer and a cathode on the electrolyte layer by a film forming method, and then heat-treating it.

According to one embodiment, the method for manufacturing a solid oxide cell comprising a three-dimensional ceramic composite interface structure further comprises forming a diffusion barrier layer between the electrolyte layer and the cathode functional layer.

According to one embodiment, the method for manufacturing a solid oxide cell comprising a three-dimensional ceramic composite interface structure, the film forming method is any one selected form the group consisting of electrostatic spray deposition (ESD), pulsed laser deposition (PLD), sputtering, atomic layer deposition (ALD) and chemical vapor deposition (CVD), in particular ESD.

According to one embodiment, the method for manufacturing a solid oxide cell comprising a three-dimensional ceramic composite interface structure is characterized in that the three-dimensional structure of the surface of the anode substrate is imprinted on the electrolyte layer.

According to one embodiment, the method for manufacturing a solid oxide cell comprising a three-dimensional ceramic composite interface structure is characterized in that the three-dimensional structure of the electrolyte layer is imprinted on the cathode and the cathode functional layer.

According to one embodiment, the method for manufacturing a solid oxide cell comprising a three-dimensional ceramic composite interface structure is characterized in that all of the interface between the anode substrate and the electrolyte layer and the interface between the electrolyte layer and the cathode and the cathode functional layer have the three-dimensional structure of the polymer mold surface.

According to one embodiment, the method for manufacturing a solid oxide cell comprising a three-dimensional ceramic composite interface structure is characterized in that the three-dimensional structure of the electrolyte layer is imprinted on the diffusion barrier layer.

According to one embodiment, the method for manufacturing a solid oxide cell comprising a three-dimensional ceramic composite interface structure is characterized in that all of the interface between the anode substrate and the electrolyte layer, the interface between the electrolyte layer and the diffusion barrier layer and the interface between the diffusion barrier layer and the cathode and the cathode functional layer have the three-dimensional structure of the polymer mold surface.

According to other aspect of the present invention, there is provided a solid oxide cell having a three-dimensional ceramic composite interface structure manufactured by the method for manufacturing a solid oxide cell comprising a three-dimensional ceramic composite interface structure.

Effect of the Invention

According to the manufacturing method of the present invention, by manufacturing both of a cathode portion and an anode portion of a solid oxide cell in a three-dimensional structure, the reaction area with the fuel gas can be maximized and the contact area with the electrolyte can be maximized, compared to the planar contact between an electrolyte and an electrode produced by the conventional film forming process. It has advantages of having a larger reaction area compared to a two-dimensional reaction layer structure of the surface or stack of a single cell. Since the maximum performance of the solid oxide cell is proportional to the reaction area, the effect of increasing the electrochemical efficiency of the cell can be exhibited by this three-dimensional interface structure.

According to the present invention, the interface of each component of the solid oxide cell can be readily manufactured in a three-dimensional structure by introducing a polymer mold into a tape lamination process.

DETAILED DESCRIPTION OF THE INVENTION

Hereinafter, the present invention will be described with reference to the drawings.

According to the present invention, a tape of an anode of a solid oxide cell is first prepared, and the tape of the anode is heated/pressed together with a polymer mold having a three-dimensional structure obtained by molding a polymeric material in a template of a three-dimensional pattern structure to prepare an anode substrate having a three-dimensional structure on its surface. Thereafter, a solid oxide cell comprising a three-dimensional ceramic composite interface structure may be manufactured by depositing an electrolyte and a cathode on an anode substrate having a three-dimensional structure on its structure by a deposition process.

Figure 1:
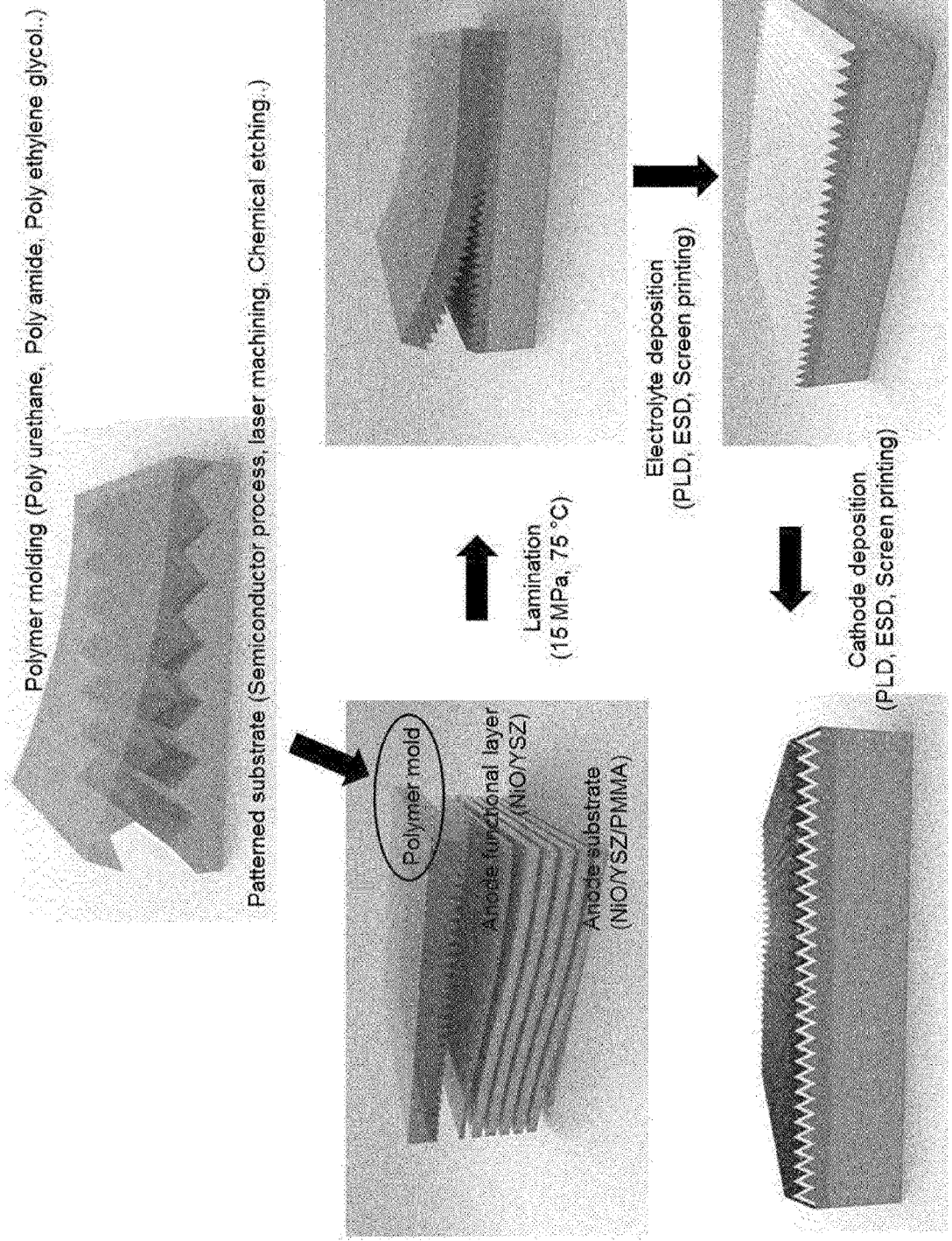
FIG. 1 schematically illustrates an embodiment of a method for manufacturing a three-dimensional ceramic composite interface structure according to the present invention.
Figure 2:
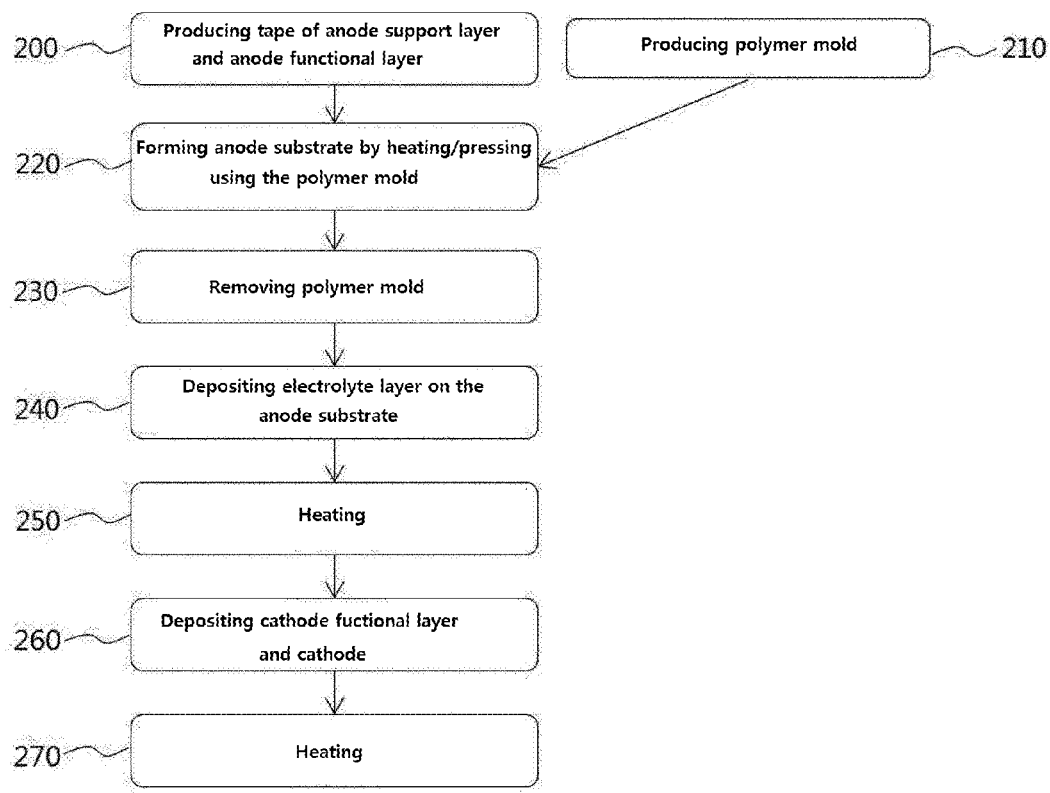
FIG. 2 is a flowchart schematically illustrating a method for manufacturing a three-dimensional interface structure as shown in FIG. 1.

FIG. 1 schematically shows an embodiment of the method for manufacturing a solid oxide cell comprising a three-dimensional ceramic composite interface structure according to the present invention and FIG. 2 is a schematic flowchart.

Specifically, the method for manufacturing a solid oxide cell comprising a three-dimensional ceramic composite interface structure according to the present invention, as shown in FIG. 2, comprises:

preparing tapes of an anode support layer and an anode functional layer (200), preparing a polymer mold having a three-dimensional structure (210), pressing/heating the polymer mold having a three-dimensional structure on the tape of the anode support layer or anode functional layer to form an anode substrate having a three-dimensional structure on its surface (220), removing the polymer mold from the anode substrate (230), film-forming an electrolyte layer on the anode substrate having a three-dimensional structure on its surface by a film forming method (240), and then heat-treating it (250), and film-forming a cathode functional layer and a cathode on the electrolyte layer by a film forming method (260), and then heat-treating it (270).

In the present invention, the polymer mold of the three-dimensional structure may be obtained by molding a heat-curable or UV-curable polymer material in the template produced through a semiconductor process or laser processing.

The material of the polymer mold is, for example, at least one selected from the group consisting of polyurethane (PU), polyurethane acrylate (PUA), polyimide (PI), polyethylene glycol (PEG) and polydimethylsiloxane (PDMS).

The polymer mold is fabricated by applying a liquid polymer solution on the template produced by laser processing, micromachining, etching, etc., and then curing it by applying heat or ultraviolet rays, thereby easily copying the structure of the template. In general, the heat-curable polymer can produce a mold quickly and repeatedly in 1 hour and the UV-curable polymer in about 1 minute, and the mold with low surface energy can be used repeatedly.

In the present invention, the anode support layer may include a metal oxide. In one embodiment, the metal oxide includes one or more of nickel oxide (NiO) and Yttria Stabilized Zirconia (YSZ). In addition, according to one embodiment, the anode support layer may be manufactured in a sheet form by a tape casting process. Specifically, the anode support layer is made to a solid tape-like sheet by dispersing and mixing the metal oxide in a solvent with a pore-forming agent, a plasticizer and a binder, preparing a film having a predetermined thickness through a tape casting process, and evaporating the solvent.

The solvent may be an organic solvent. For example, the solvent is ethanol or toluene. The pore-forming agent may be carbon and a polymer material that can form a pore structure, for example poly(methylmethacrylate) (PMMA). The plasticizer may be a polymer material that can increase flexibility of the substrate at room temperature, for example dibutyl phthalate (DBP). The binder may be a polymer material that can facilitate adhesion between the particles and hold the structure, for example polyvinyl butyral (PVB).

In one embodiment, the plasticizer serves to maintain the plasticity of the tape and the binder serves to maintain the rigidity of the structure. During the sintering process, these polymer materials become disappeared and the pore-forming agent can form a pore structure.

In one embodiment of the present invention, the anode functional layer is similar to the anode support layer, but it is a layer in which no PMMA is added, no pore structure is present and a main electrode reaction takes place. Since no pore is present, a denser NiO-YSZ composite structure can be obtained compared to the anode support layer, which provides an advantage that the fabrication of surface structure and electrolyte deposition through imprinting is possible. The manufacturing process of the anode functional layer according to an embodiment of the present invention is the same as the manufacturing process of the anode support layer except that no PMMA is used.

The anode substrate is manufactured through a heating/pressing (lamination) process in a state the anode support layer and the anode functional layer are laminated. The anode substrate serves to facilitate support of the entire cell or diffusion of hydrogen gas through pore structures. Electrochemical reactions of hydrogen and oxygen ions occur mainly in the anode functional layer.

The pressing/heating process of the tapes of the anode support layer and the anode functional layer is usually carried out at 10 to 15 MPa and 70 to 80° C. However, the condition of the pressing/heating process may be adjusted so that the anode support layer and the anode functional layer are made of a single green body.

In one embodiment, as film-formation techniques, deposition-based processes such as ESD, pulsed laser deposition (PLD), sputtering, atomic layer deposition (ALD), chemical vapor deposition (CVD), and the like may be used. ESD may be carried out, in particular, at room temperature/atmospheric pressure. ESD is preferably used in view that it can attain uniform deposition by electrical attraction.

By using the deposition method, an electrolyte, a diffusion barrier layer, a cathode functional layer, and a cathode are sequentially deposited.

The electrolyte layer may be produced using YSZ (Yttria Stabilized Zirconia; $ZrO_2)_{0.92}(Y_2O_3)_{0.08}$, and the thickness may be 4 to 10 μm.

The heat treatment of the electrolyte layer may be performed at 1300 to 1400° C. for 3 to 5 hours, for example.

The diffusion barrier layer may be produced by a PLD process for formation of a thin and uniform film and by using GDC (Gadolinium doped ceria; $Gd_{0.1}Ce_{0.9}O_{1.95}$), and the thickness may be 250 nm to 1 μm.

The cathode functional layer may be produced using a mixture of GDC and LSC in a ratio of 2-8:8-2, or 3-7:7-6, or 4-6:6-4, or about 5:5 by weight. The thickness may be about 2 to 5 μm. The cathode functional layer serves to prevent physical defects caused by the difference in thermal expansion coefficient between the electrolyte and the cathode.

The cathode may be produced using a material having high catalytic activity in an oxygen reduction reaction and high electron and ion conductivity, for example, $La_{1-x}Sr_xCo_{1-y}Fe_yO_3$ (LSCF), $La_{1-x}Sr_xFeO_3$ (LSF), $Ba_{1-x}Sr_xCo_{1-y}Fe_yO_3$ (BSCF), $La_{1-x}Sr_xCoO_3$ (LSC) and the like, in particular LSC and the thickness may be about 3 to 10 μm.

Heat treatment of the cathode functional layer and the cathode is carried out at about 900 to 1000° C. for 1 hour.

According to the present invention, by introducing a polymer mold in a tape lamination process, it is possible to readily manufacture the interface of each component of the solid oxide cell in a three-dimensional structure.

The tape lamination refers to fabricating a single molded body by applying heat and pressure to a plurality of tapes. Specifically, the material particles are dispersed in an organic solvent together with a dispersant, a plasticizer and a binder to prepare a liquid tape having a predetermined thickness, and then dried to obtain a flexible solid tape. This allows for continuous fabrication of the substrate. Each of the obtained tapes can be laminated to a desired thickness and then subjected to heating and pressing (lamination) to produce a single substrate. Since the rearrangement is achieved by the flow of the material particles and the polymer in the lamination process, it is easy to obtain a uniform particle distribution and control the final thickness even in the case of heterogeneous particles.

Processing such as etching, micromachining or laser processing, it is difficult to use a substrate in which ceramic particles and polymers are mixed, such as a tape substrate immediately after lamination, and thus it has a disadvantage that the substrate should be used through subsequent processing after sintering. However, in the imprinting process used in the present invention, a polymer mold is placed on top in the lamination process to produce a structure. Therefore, there is an advantage that the interface structure can be sufficiently produced by the existing lamination process without requiring an additional subsequent process.

In one aspect, the shape of the three-dimensional interface structure can have a variety of structures having a higher surface area compared to a planar structure, such as prism, line, pillar shapes, etc. In particular, in the case of using for lamination of the anode substrate, a large structure of substrate material particles may be applied to form a micro/nano structure. A polymer mold having the same surface structure can be manufactured by applying a curable polymer material having a low surface energy to a mold made through a fabrication method of micro/nano structures such as laser processing, micromachining or etching process and curing it.

The three-dimensional interface structure can be used in various electrochemical device technologies such as batteries including solid oxide cells and all-solid-state cells, low-temperature fuel cells (polymer electrolyte fuel cells and direct methanol fuel cells, phosphate fuel cells, etc.).

Hereinafter, examples are provided to help the understanding of the present invention, but the following examples are merely for exemplifying the present invention, and various changes and modifications can be made within the scope and spirit of the present invention. It will be apparent to those skilled in the art, and it is obvious that such modifications and variations fall within the scope of the appended claims.

Example 1

NiO, YSZ and PMMA are mixed in a volume ratio of 28:42:30, respectively, in a mixed solution of ethanol and toluene (ethanol:toluene=6:4, volume ratio) (the total powder volume is 23-25 vol % of the mixed solution). Thereto, dibutyl phthalate (DBP) is added as a plasticizer in an amount of 15 to 16 wt % relative to the mixed solution of ethanol and toluene, and polyvinyl butyral (PVB) is added as a binder in an amount of 15 to 16 wt % relative to the mixed solution of ethanol and toluene. The mixture was made into a liquid film having a thickness of about 750 μm through a tape casting process at about 2 mm/s and room temperature, and then the solvent was evaporated to form an anode support layer having a thickness of about 150 μm.

Next, NiO and YSZ are mixed in a volume ratio of 40:60 in a mixed solution of ethanol and toluene (ethanol:toluene=6:4, volume ratio) (the total powder volume is 23 to 25 vol % of the mixed solution). Thereto, dibutyl phthalate (DBP) is added as a plasticizer in an amount of 15 to 16 wt % relative to the mixed solution of ethanol and toluene, and polyvinyl butyral (PVB) is added as a binder in an amount of 15 to 16 wt % relative to the mixed solution of ethanol and toluene. The mixture was made into a liquid film having a thickness of about 120 μm through a tape casting process at about 2 mm/s and room temperature, and then the solvent was evaporated to form an anode functional layer having a thickness of about 30 μm.

The lamination process of heating/pressurizing was performed with 7 to 8 anode support layers having a thickness of about 150 μm and an anode functional layer having a thickness of 30 μm being laminated. As a result, an anode substrate of about 1.3 mm thickness was obtained. It was then sintered at about 1300~1400° C. to shrink to about 1 mm thickness.

Apart from the above, as shown in FIG. 1, with a metal structure produced by laser processing or micromachining as a template having a three-dimensional shape, or a silicon substrate structure produced through a semiconductor process, a PDMS solution is applied on the template and thermally cured to produce a PDMS structure. Thereafter, a liquid polyurethane acrylate was applied and then UV cured to prepare a polymer mold having a prism-shaped three-dimensional surface structure.

On the anode substrate obtained above, the polymer mold was positioned with the three-dimensional surface structure of the polymer mold facing the anode substrate. Thereafter, lamination was performed under conditions of 75° C. and 15 MPa to form an anode substrate having a three-dimensional structure on its surface. Then, the polymer mold was removed from the anode substrate.

After the electrolyte was film-formed by ESD on the anode substrate having a three-dimensional structure, sintering was carried out at 1350° C. for 3 hours so that the NiO-YSZ of the anode was sufficiently dense. The diffusion barrier layer having a thickness of 250 nm was formed on the electrolyte layer with GDC by a PLD process. Subsequently, an cathode functional layer having a thickness of about 2.5 μm is formed on the diffusion barrier layer with a material in which GDC and LSC are mixed at a ratio of 5:5 by an ESD process, and a cathode having a thickness of about 5 μm is formed with LSC by an ESD process. Thereafter, sintering was performed at about 950° C. for 1 hour. As a result, an SOFC having a three-dimensional interface structure was obtained.

Experimental Example 1

A 1 cm×1 cm cathode functional layer and a cathode prepared in Example 1 were deposited on a 2 cm×2 cm square anode substrate prepared in Example 1 to produce a cell, and the cell was inserted into a jig. Then, the temperature inside the electric furnace was set to 450° C., 500° C., 550° C., 600° C. and 650° C., respectively. At this time, a glass sealant was used to prevent the gases of the fuel electrode and the air electrode from mixing. Ni foam and gold mesh were used as current collectors of the anode and the cathode, respectively. Air was flowed to the cathode and hydrogen having 3% moisture added was flowed to the anode at 200 sccm, respectively and current was applied in an OCV state to measure electrochemical performance.

In the OCV region where no current is applied, activity of the cathode material has the greatest influence. In the middle region (~0.75 V), ion transfer rate has the greatest influence. In the final region (<0.55 V), mass transfer rate has the greatest influence. On the other hand, the lower the temperature, the lower the ion and electron conductivity of the material, so the maximum power density will also be proportional to the temperature. Solid oxide cells generally have an operating temperature range of 600 to 800° C.

Through impedance analysis, the resistance of the cell can be measured and its components can be determined. In general, the resistance due to mass transfer mainly appears in the region of 10 Hz or lower, the resistance due to oxygen ion transfer mainly appears in the region of 10 Hz to 10 kHz, and the resistance due to electron transfer mainly appears in the high frequency of 10 kHz or higher.

Figure 3:
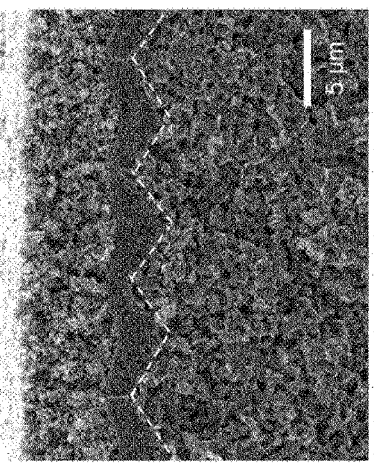
FIG. 3 is a graph plotting cell voltage and power density according to current density of an SOFC including the cathode fabricated by Electrostatic Spray Deposition (ESD) on a planar substrate and a substrate having a three-dimensional interface structure.
Figure 3:
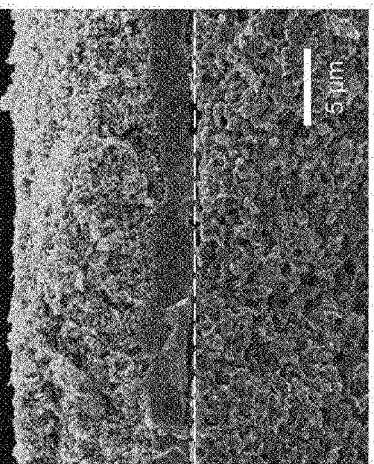
Figure 3:
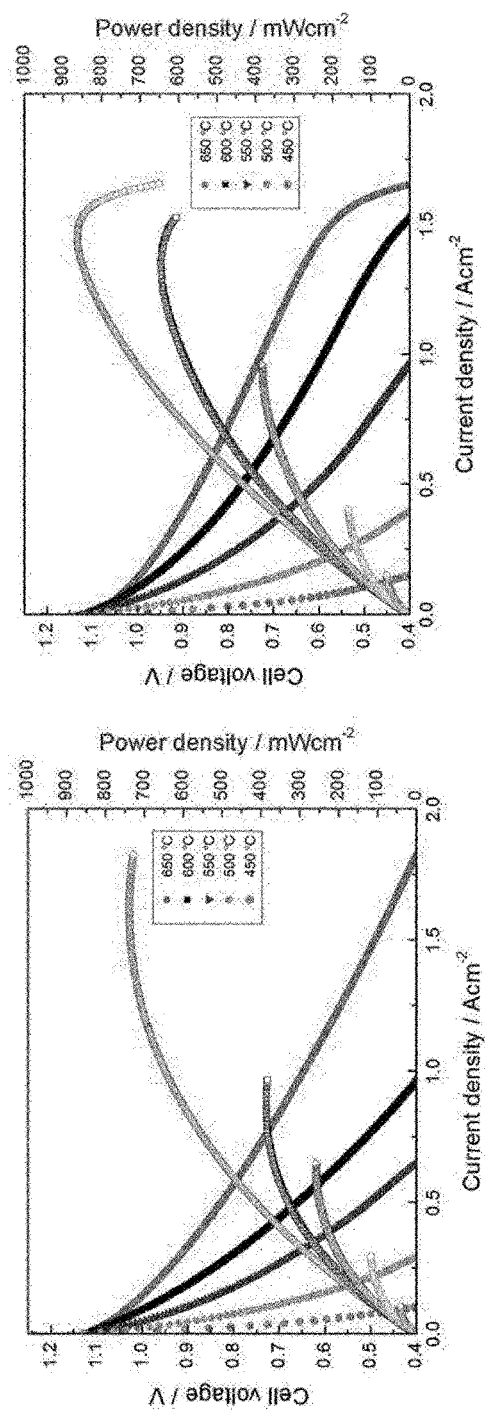

FIG. 3 is a graph plotting cell voltage and power density according to current density of an SOFC including the cathode fabricated by Electrostatic Spray Deposition (ESD) on a planar substrate and a substrate having a three-dimensional interface structure. Table 1 shows peak power density depending on the temperature.

TABLE 1

| Temp | Peak Power Density (mW/cm2) | |
| --- | --- | --- |
| | Flat | Prism |
| 650° C. | 732.16 | 862.89 |
| 600° C. | 436.71 | 646.6 |
| 550° C. | 260.15 | 384 |
| 500° C. | 117.12 | 159.2 |
| 450° C. | 40.64 | 59.85 |

It can be seen from the results that the maximum power density is high when the cell has a three-dimensional interface structure.

Figure 4:
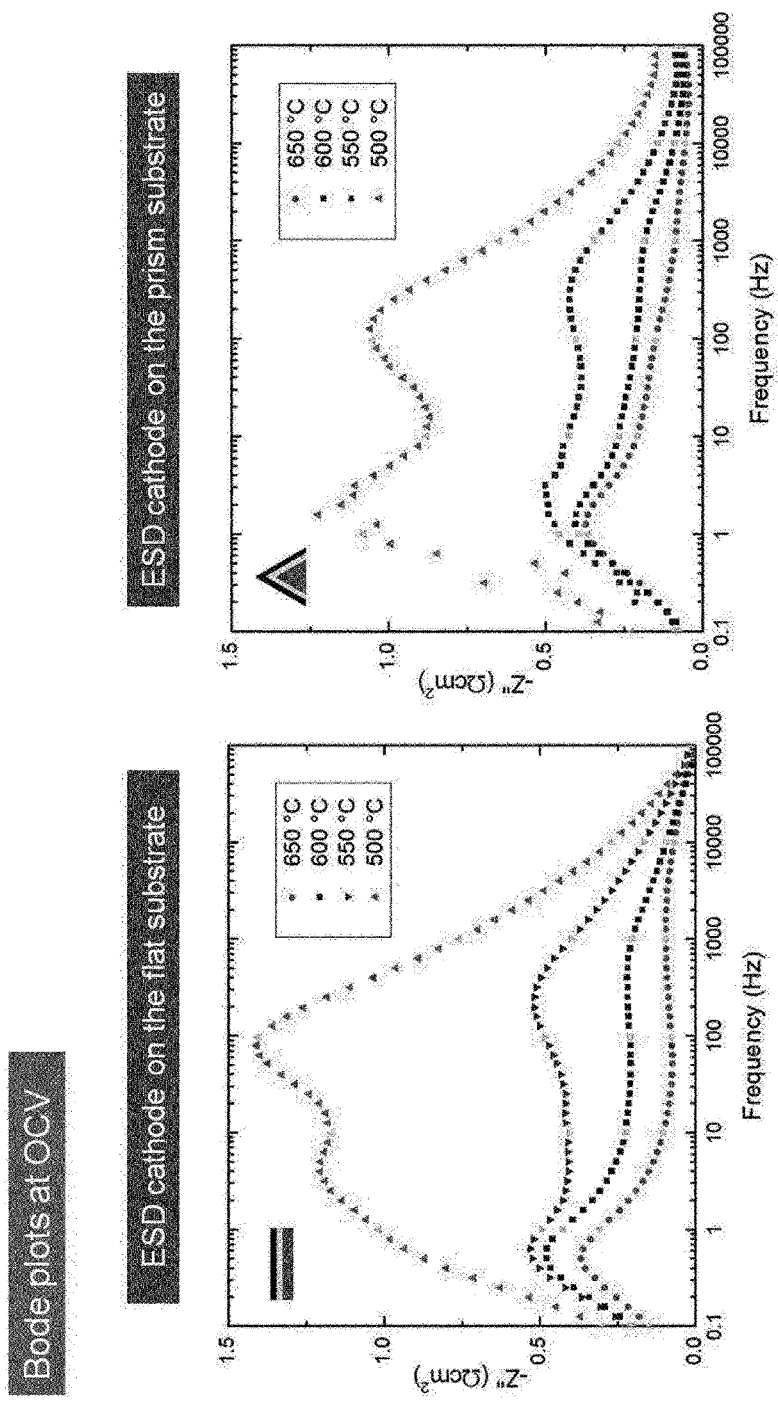
FIG. 4 is a graph plotting resistance according to frequency in an open circuit voltage (OCV) region for an SOFC including the cathode fabricated by ESD on a planar substrate and a substrate having a three-dimensional interface structure.
Figure 5:
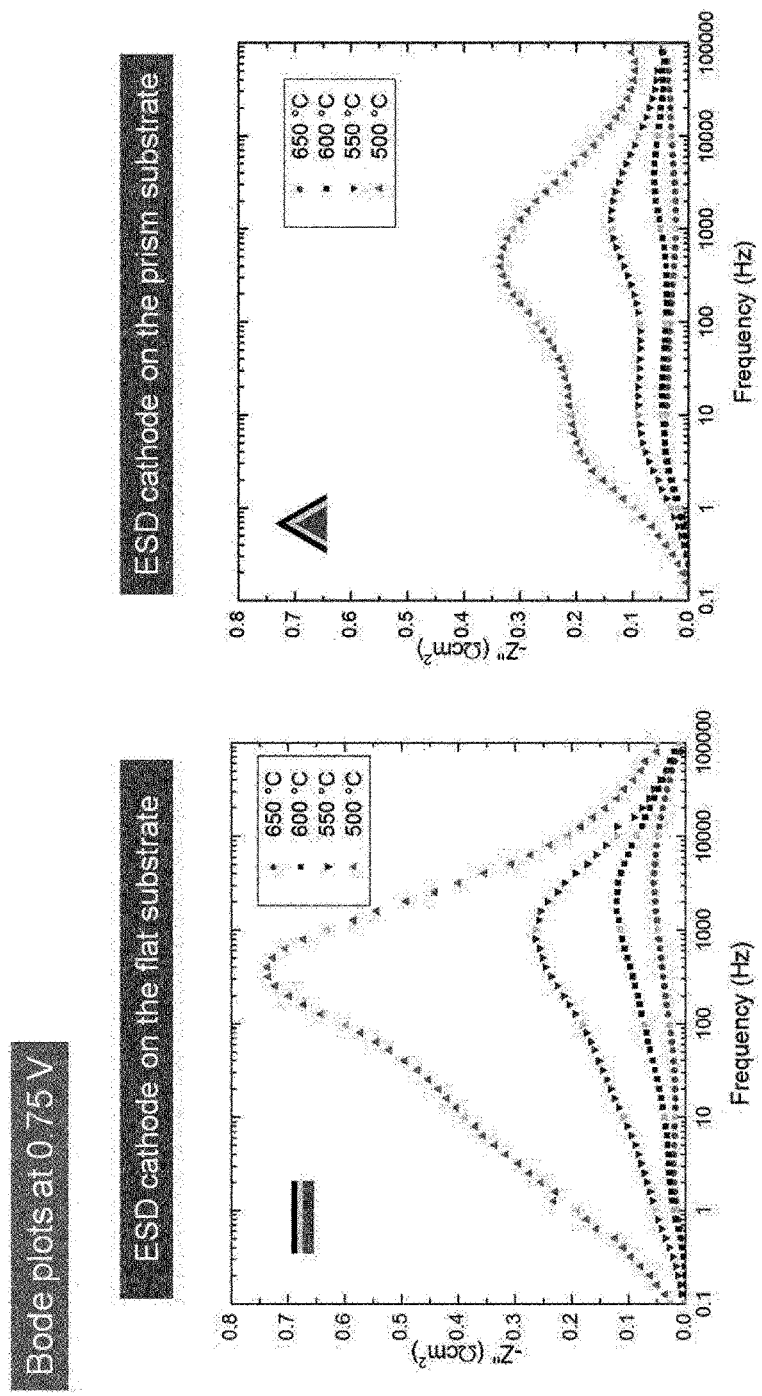
FIG. 5 is a graph plotting resistance according to frequency at 0.75 V of an SOFC including the cathode fabricated by ESD on a planar substrate and a substrate having a three-dimensional interface structure.

FIG. 4 is a graph plotting resistance according to frequency in an open circuit voltage (OCV) region for an SOFC including the cathode fabricated by ESD on a planar substrate and a substrate having a three-dimensional interface structure and FIG. 5 is a graph plotting resistance according to frequency at 0.75 V of an SOFC including the cathode fabricated by ESD on a planar substrate and a substrate having a three-dimensional interface structure.

It can be seen that in the case of FIG. 4 (OCV region), the difference in resistance according to the presence or absence of the three-dimensional interface structure is not large at a temperature of 500° C. or higher, but in the case of FIG. 5 (0.75 V region), the resistance of the cell having the interface structure is lowered. This may be because the ion transfer path has increased due to the interface structure, thereby reducing the resistance in the 10 Hz-10 kHz region representing the component of oxygen ion transfer. The pronounced change in resistance in the 0.75 V region compared to the OCV region also supports the increased oxygen ion transfer path. Accordingly, it can be seen that the interface structure helps to increase the performance of the cell.

As described above, it can be seen that the solid oxide cell having a three-dimensional interface structure according to the present invention has improved performance as compared with the conventional planar interface structure.

The present process is not only easily applicable to the fabrication of an anode substrate of the conventional solid oxide cell but is also expected to improve the performance of the battery by introducing a structure with an increased surface area.

INDUSTRIAL AVAILABILITY

When using a solid oxide cell having a three-dimensional interface structure of the present invention, it is possible to expect a fuel cost reduction effect through improved fuel cell performance, and to have improved efficiency through the increased reaction area compared to the conventional cell. Furthermore, since it is a structure through which integration is facilitated, it is expected to improve the performance of the fuel cell and reduce the occurrence of pollution according to the global trend in which high efficiency green energy technology is emphasized at present.

Industrially, the present invention is applicable to high-temperature electrochemical devices such as SOFCs (Solid Oxide Fuel Cells) and SOECs (Solid Oxide Electrolyser Cells), as well as battery devices such as all-solid-state batteries. In addition, it is possible to apply to other energy technology fields in which the performance can be improved using the three-dimensional interface structure among the energy systems.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method for manufacturing a solid oxide cell comprising a three-dimensional ceramic composite interface structure, the method comprising:
    preparing each of a plurality of anode support layers and an anode functional layer, each layer formed by tape casting,
    preparing a polymer mold having a three-dimensional structure,
    laminating the plurality of anode support layer on one side of the anode functional layer to form a laminate, comprising pressing while heating the laminate so that the other side of the anode functional layer is in contact with the pressing surface of the polymer mold to form an anode substrate having a three-dimensional structure formed on one surface;
    removing the polymer mold from the anode substrate,
    film-forming an electrolyte layer on a surface of the anode substrate having a three-dimensional structure on its surface by a film forming method, and then heat-treating it, and
    film-forming a cathode functional layer and a cathode on the electrolyte layer by a film forming method, and then heat-treating it,
    wherein each of the anode support layer has a pore-structure prepared by dispersing and mixing a metal oxide in a solvent with a pore-forming agent, a plasticizer and a binder, and the anode functional layer is not porous.

2. The method for manufacturing a solid oxide cell according to claim 1, further comprising forming a diffusion barrier layer between the electrolyte layer and the cathode functional layer.

3. The method for manufacturing a solid oxide cell according to claim 2, wherein the three-dimensional structure of the electrolyte layer is imprinted on the diffusion barrier layer.

4. The method for manufacturing a solid oxide cell according to claim 2, wherein all of the interface between the anode substrate and the electrolyte layer, the interface between the electrolyte layer and the diffusion barrier layer and the interface between the diffusion barrier layer and the cathode and the cathode functional layer have the three-dimensional structure of the polymer mold surface.

5. The method for manufacturing a solid oxide cell according to claim 1, wherein the film forming method is any one selected form the group consisting of electrostatic spray deposition (ESD), pulsed laser deposition (PLD), sputtering, atomic layer deposition (ALD) and chemical vapor deposition (CVD).

6. The method for manufacturing a solid oxide cell according to claim 5, wherein the film forming method is ESD.

7. The method for manufacturing a solid oxide cell according to claim 1, wherein the three-dimensional structure of the surface of the anode substrate is imprinted on the electrolyte layer.

8. The method for manufacturing a solid oxide cell according to claim 1, wherein the three-dimensional structure of the electrolyte layer is imprinted on the cathode and the cathode functional layer.

9. The method for manufacturing a solid oxide cell according to claim 1, wherein all of the interface between the anode substrate and the electrolyte layer and the interface between the electrolyte layer and the cathode and the cathode functional layer have the three-dimensional structure of the polymer mold surface.

10. A solid oxide cell comprising a three-dimensional ceramic composite interface structure, manufactured by the method according to claim 1.

11. The solid oxide cell according to claim 10, wherein all of the interface between the anode substrate and the electrolyte layer and the interface between the electrolyte layer and the cathode and the cathode functional layer have a three-dimensional structure.

12. The solid oxide cell according to claim 10, wherein all of the interface between the anode substrate and the electrolyte layer, the interface between the electrolyte layer and the diffusion barrier layer and the interface between the diffusion barrier layer and the cathode and the cathode functional layer have a three-dimensional structure.

13. The solid oxide cell according to claim 10, further comprising a diffusion barrier layer between the electrolyte layer and the cathode functional layer.

14. The solid oxide cell according to claim 13, wherein the three-dimensional structure of the electrolyte layer is imprinted on the diffusion barrier layer.

15. The solid oxide cell according to claim 13, wherein all of the interface between the anode substrate and the electrolyte layer, the interface between the electrolyte layer and the diffusion barrier layer and the interface between the diffusion barrier layer and the cathode and the cathode functional layer have the three-dimensional structure of the polymer mold surface.

16. The solid oxide cell according to claim 10, wherein the three-dimensional structure of the surface of the anode substrate is imprinted on the electrolyte layer.

17. The solid oxide cell according to claim 10, wherein the three-dimensional structure of the electrolyte layer is imprinted on the cathode and the cathode functional layer.

18. The solid oxide cell according to claim 10, wherein all of the interface between the anode substrate and the electrolyte layer and the interface between the electrolyte layer and the cathode and the cathode functional layer have the three-dimensional structure of the polymer mold surface.

* * * * *